United States Patent

Becker

Patent Number: 5,091,345
Date of Patent: Feb. 25, 1992

[54] GLASS COMPOSITION

[75] Inventor: Gerd Becker, Urbar/Koblenz, Fed. Rep. of Germany

[73] Assignee: Johnson Matthey Public Limited Company, United Kingdom

[21] Appl. No.: 531,058

[22] Filed: May 31, 1990

[30] Foreign Application Priority Data

May 31, 1989 [GB] United Kingdom ............ 8912506

[51] Int. Cl.$^5$ ................................................ C03C 8/00
[52] U.S. Cl. ................................ 501/14; 501/171; 501/21; 501/22; 501/24; 501/26; 501/70; 501/71; 501/72
[58] Field of Search .............. 501/14, 17, 21, 22, 501/24, 26, 70, 71, 72

[56] References Cited

U.S. PATENT DOCUMENTS

| | | | |
|---|---|---|---|
| 3,098,753 | 7/1963 | Van Dolah et al. | 501/25 |
| 3,499,775 | 3/1970 | Albinak et al. | |
| 3,927,238 | 12/1975 | DiMarcello | 501/21 X |
| 4,312,951 | 1/1982 | Eppler | 501/26 X |
| 4,316,963 | 2/1982 | Hommel et al. | 501/26 X |
| 4,340,645 | 7/1982 | O'Connor | 501/17 X |
| 4,361,654 | 11/1982 | Ohmura et al. | 501/26 X |
| 4,877,758 | 10/1989 | Lee et al. | 501/26 X |

FOREIGN PATENT DOCUMENTS

| | | |
|---|---|---|
| 0018559 | 4/1980 | European Pat. Off. |
| 0192844 | 12/1985 | European Pat. Off. |
| 6149342 | 11/1981 | Japan ............ 501/26 |
| 0108345 | 6/1985 | Japan ............ 501/21 |
| 61-178440 | 8/1986 | Japan. |
| 1052481 | 11/1983 | U.S.S.R. ............ 501/21 |

OTHER PUBLICATIONS

Patent Abstracts of Japan, vol. 10, No. 390 (C-394)(2447), 26 Dec. 1986; & JP-A-61178440 (Nippon Furitsuto K.K.).

*Primary Examiner*—Karl Group
*Attorney, Agent, or Firm*—Stevens, Davis, Miller & Mosher

[57] ABSTRACT

A glass flux composition consisting essentially by weight of 30–70% $SiO_2$, 10–30% CaO, 0–20% ZnO, 3–8% $MoO_3$, 0–20% $B_2O_3$, 0–25% $Al_2O_3$, 0–10% $K_2O$, 0–10% $Na_2O$, 0–10% MgO, 0–15% BaO, 0–7% $Li_2O$, 0–10% PbO, 014 5% SrO, 0–10% CeO, 0–0.1% CoO and 0–5% $P_2O_5$ is a useful opacifying composition for preparing a glaze composition for ceramics.

11 Claims, No Drawings

GLASS COMPOSITION

This invention relates to a glass flux composition, a glaze composition containing it, the use of the glaze composition for decorating a ceramic body, and a ceramic article bearing the glaze composition which has been fired thereon.

Many different ingredients in many different concentrations in many different combinations are known in glass flux compositions for use in glaze compositions for ceramics. A surprisingly useful new flux composition has now been discovered.

Japanese patent specification No. 61178440 discloses a powder coating method characterized in that, after pulverization of a powder coating frit with a content of $Na_2O$ in the frit composition of under 15.5 weight percent, it is electrostatically adhered to a metal substrate surface. Besides the $Na_2O$, the frit preferably contains by weight 30–65% $SiO_2$, 0.5–12% $Al_2O_3$, 3–35% $B_2O_3$, 0.5–10% $K_2O+Li_2O$, 0.25% $MgO+CaO+ZnO+BaO+SrO$, 0–10% F, 0–10% $P_2O_5$ and 0–3% $MoO_3$.

The present invention provides a glass flux composition consisting essentially by weight of 30–70% $SiO_2$, 10–30% CaO, 0–20% ZnO, 3–8% $MoO_3$, 0–20% $B_2O_3$, 0–25% $Al_2O_3$, 0–10% $K_2O$, 0–10% $Na_2O$, 0–10% MgO, 0–15% BaO, 0–7% $Li_2O$, 0–10% PbO, 0–5% SrO, 0–10% CeO, 0–0.1% CoO and 0–5% $P_2O_5$.

The invention provides also a glaze composition for ceramics, which composition consists essentially by weight of 70–96% of glass flux composition comprising the present glass flux composition, 4–30% of refractory material and 0–25% of pigment.

The invention also provides a ceramic article bearing on its surface the glaze composition which has been fired thereon.

The invention provides also a method of decorating a ceramic body, which method comprises applying the glaze composition to the body and then firing the composition.

The present glass flux composition contains 3–8% of $MoO_3$. It has been discovered that this is a remarkably good white opacifier in the present compositions. Zirconia is commonly employed as a white opacifier in glaze compositions, but it has been discovered that the present $MoO_3$ has much greater white opacifying power. Thus, the glaze composition can contain less opacifier. This is particularly advantageous since opacifiers such as zirconia are not as stable as is desired in once firing-fast firing processes and often do not produce a finish of the desired chemical and physical resistance.

The present glass flux composition produces an extremely white glazed ceramic article when pigments are not employed with the composition. The glaze resulting from the present glaze composition is opaque and of high gloss. Its surface lacks pinholes and other surface defects. The glazed articles have extremely good chemical resistance; they are very resistant to acids and bases, including being very resistant to washing in dishwashers. The glazed articles have good physical resistance; they are resistant to abrasion, for instance marking by table knives.

The articles are preferably architectural ceramic items such as wall tiles, or pottery articles such as tableware, for instance dinnerware, or hollow-ware.

In a particular embodiment, the flux composition consists essentially by weight of 30–70% $SiO_2$, 10–30% CaO, 5–20% ZnO, 3–8% $MoO_3$, 0–15% $B_2O_3$, 0–25% $Al_2O_3$, 0–10% $K_2O$, 0–10% $Na_2O$, 0–10% MgO, 0–15% BaO, 0–7% $Li_2O$, 0–10% PbO, 0–5% SrO, 0–10% CeO, 0–0.1% CoO and 0–5% $P_2O_5$.

The flux composition preferably contains 40–65% silica. Percentages herein are by weight unless otherwise indicated. Its $B_2O_3$ content is preferably 2–19%, for instance 2–10%. Its $Al_2O_3$ content is preferably 3–15%. Its CaO content is preferably 12–25%. Its $K_2O$ content is preferably 0.5–5%. Its $Na_2O$ content is preferably 0.5–2.5%. Its ZnO content is preferably 0–12%, for instance 6–12%. Its MgO content is preferably 0.1–5%. Its $MoO_3$ content is preferably 3.3–8%. Its BaO content is preferably 0–7%. Its $Li_2O$ content is preferably 0–3%. Its PbO content is preferably 0–5%.

Its SrO content is preferably 0–2%. Its CeO content is preferably 0–5%. Its CoO content is preferably 0–0.05%. Its $P_2O_5$ content is preferably 0–2%. Because $MoO_3$ is (like zirconia) a comparatively rare, and therefore expensive, material, it is desirable to employ a lower amount of it consistent with securing the desired results. We prefer accordingly that the flux composition contains 3.3–6% $MoO_3$. Preferably, the composition consists essentially of the $SiO_2$, CaO and $MoO_3$, though optional ingredients which do not mar its essential character can also be present.

The flux composition can be prepared and used in conventional ways. It can be prepared by a process comprising admixing its ingredients. The ingredients can be introduced in the form of their oxides or as compounds such as carbonates which form the oxides during production. Conveniently, the flux composition is a frit, which can be prepared in the conventional way. The frit can be prepared by a process comprising melting its ingredients together, quenching to form a glass, and optionally granulating. Alternatively, part of the flux composition can be incorporated while admixing a frit consisting essentially of the other ingredients with the refractory material and, if desired, pigment to form the glaze composition.

The present frits can be of conventional particle size. Molybdenum trioxide used in their production can be the normal commercially available material, for instance material less than 0.1% by weight of which is above 250 microns in particle size.

The present glaze composition can be prepared and used in conventional ways. The glaze composition usually consists essentially by weight of 70–96% of glass flux composition comprising the present glass flux composition, 4–30% of refractory material and 0–25% of pigment. The refractory material can be conventional. It can be one or more of china clay, alumina, zinc oxide, lithium carbonate, calcium carbonate etc. China clay is preferred. The pigment can be conventional. Preferably the glass flux composition in the glaze composition consists of the present glass flux composition, though the present glass flux composition (particularly a frit) can be employed in admixture with other glass flux compositions (particularly other frits). The glaze composition can contain the usual additives.

In a particular embodiment, the glaze composition consists essentially by weight of 70–95% of glass flux composition comprising the present glass flux composition, 5–30% of refractory material and 0–25% of pigment. In a preferred embodiment, the glaze composition consists essentially by weight of 80–96% of glass flux composition comprising the present glass flux composition, 4–20% of refractory material and 0.5–5% of pigment.

The glaze composition can be prepared by a process comprising admixing its ingredients, preferably by milling.

The glaze composition can be applied to a ceramic body in the usual way, for instance by dipping or spraying. The glaze composition is usually applied in the form of liquid containing a carrier, usually water, and optionally any of the usual additives, such as carboxymethylcellulose to aid adhesion of the composition to the body. The glaze composition can be allowed to dry on the body at ambient temperature. Alternatively drying can be speeded up by passing the body bearing the composition through a dryer.

The glaze composition can be fired on the body in the usual way. The composition is preferably fired at 900°–1200° C. it is preferably fired for 0.5–24 hours. In an advantageous embodiment, a glazed article is produced in a once firing, fast firing, operation. Thus, an architectural ceramic item, particularly a wall tile, bearing the glaze composition, is preferably fired in a once firing, fast firing, operation at 1100°–1160° C. (especially at approximately 1120° C.) by passing it through a kiln in a cycle taking 40–70 minutes (especially approximately 55 minutes) from cold to cold; this means that the item passes into the kiln ("cold") and passes through it encountering progressively higher temperatures up to the peak temperature of 1100°–1160° C. and then progressively lower temperatures until it passes out of the kiln ("cold"). In another preferred embodiment, a pottery article bearing the glaze composition is fired. This can be done in the conventional way; the article is preferably fired at 1000°–1100° C., for instance 1020°–1100° C., for 10–18 hours.

The invention is illustrated by the following Examples:

EXAMPLE 1

A frit consisting by weight of:

| | |
|---|---|
| 1.8% | sodium oxide |
| 1.7% | potassium oxide |
| 17.5% | calcium oxide |
| 8.6% | zinc oxide |
| 0.2% | magnesium oxide |
| 6.6% | alumina |
| 55.0% | silica |
| 5.0% | boric oxide |
| 3.6% | molybdenum oxide |
| 100.0% | | was prepared by melting the ingredients together, quenching to form a glass, and granulating.

EXAMPLES 2–7

Following the procedure of Example 1, frits consisting by weight of the following ingredients were prepared.

| Example | 2 | 3 | 4 | 5 | 6 | 7 |
|---|---|---|---|---|---|---|
| sodium oxide | 1.4 | 5.3 | 1.7 | 1.7 | 1.5 | 1.7 |
| lead oxide | 0.0 | 0.0 | 0.0 | 1.5 | 0.0 | 0.0 |
| potassium oxide | 2.2 | 0.7 | 1.9 | 1.9 | 1.7 | 1.9 |
| calcium oxide | 18.8 | 12.8 | 17.1 | 16.8 | 15.3 | 17.6 |
| zinc oxide | 6.7 | 0.0 | 8.4 | 8.4 | 7.6 | 8.7 |
| magnesium oxide | 0.0 | 0.1 | 0.1 | 0.0 | 0.2 | 0.0 |

-continued

| Example | 2 | 3 | 4 | 5 | 6 | 7 |
|---|---|---|---|---|---|---|
| alumina | 5.3 | 9.8 | 6.7 | 6.6 | 10.5 | 3.7 |
| boric oxide | 0.5 | 18.9 | 4.9 | 4.9 | 4.4 | 5.1 |
| molybdenum oxide | 5.5 | 5.9 | 5.9 | 5.5 | 5.9 | 6.1 |
| silica | 59.6 | 46.5 | 53.3 | 52.7 | 52.9 | 55.2 |
| | 100.0% | 100.0% | 100.0% | 100.0% | 100.0% | 100.0% |

EXAMPLE 8–14

Each of the frits of Examples 1–7 was made up into a glaze composition as follows:

To 90 parts by weight of the frit and 10 parts by weight of china clay was added 50% of water and then 0.3% carboxymethycellulose. The mixture was ground with 50% water down to a size such that not more than 18% residue remains on a 30 micron (wire to wire) sieve. Thus the glaze composition was produced.

EXAMPLES 15–21

Each of the glaze compositions of Examples 8–14 was used to decorate a ceramic body as follows:

The glaze composition was applied to a rectangular wall tile body measuring 20 cm by 25 cm in a conventional dipping machine until 50 g (wet weight) of the composition had been applied. The tile was allowed to dry at ambient temperature. It was then fast fired, at 1120° C. for 54 minutes (cold to cold).

In each case, the resulting tile had excellent whiteness and gloss, without any significant number of pinholes.

EXAMPLES 22–28

Each of the glaze composition of Examples 8–14 was used in another fast firing schedule as follows:

The glaze composition was applied to a rectangular wall tile body measuring 15 cm by 20 cm in a conventional dipping machine until 30 g (wet weight) of the composition had been applied. The tile was allowed to dry at ambient temperature. It was than fast fired, at 1140° C. for 40 minutes (cold to cold). In each case, a successful result was obtained.

The white content of the glaze stemming from the glaze composition of Example 8 was measured, and found to be 92.4% compared to a standard tile made to be 100% white.

On this standard, the glass flux composition of the present invention generally produces a glazed ceramic article of at least 90% whiteness when pigments are not employed with the composition.

EXAMPLES 29–35

Each of the glaze compositions of Examples 8–14 was applied to a tile which was then fired in a conventional firing cycle at 1000°–1040° C. for 8–12 hours. In each case, a successful result was obtained.

EXAMPLE 36

The glaze composition of Example 12 (stemming from the frit of Example 5) was used in a conventional twice firing schedule, in which the glaze composition was applied to a fired biscuit which was then fired at 1040° C. for 32 minutes. A successful result was obtained.

I claim:

1. A glass flux composition consisting essentially by weight of 30–70% $SiO_2$, 10–30% $CaO$, 0–20% $ZnO$, 3-8% $MoO_3$, 0-20% $B_2O_3$, 0-25% $Al_2O_3$, 0-10% $K_2O$, 0-10% $Na_2O$, 0-10% MgO, 0-15% BaO, 0-7% $Li_2O$, 0-10% PbO, 0-5% SrO, 0-10% CeO, 0-0.1% CoO and 0-5% $P_2O_5$.

2. A composition according to claim 1 containing by weight 3.3-8% $MoO_3$.

3. A composition according to claim 1 which is a frit.

4. A composition according to claim 2 which is a frit.

5. A glaze composition for ceramics, which composition consists essentially of:
(A) 70-96% by weight of glass flux composition comprising a component consisting essentially of, by weight, 30-70% $SiO_2$, 10-30% CaO, 0-20% ZnO, 3-8% $MoO_3$, 0-20% $B_2O_3$, 0-25% $Al_2O_3$, 0-10% $K_2O$, 0-10% $Na_2O$, 0-10% MgO, 0-15% BaO, 0-7% $Li_2O$, 0-10% PbO, 0-5% SrO, 0-10% CeO, 0-0.1% CoO and 0-5% $P_2O_5$;
(B) 4-30% by weight of refractory material; and
(C) 0-25% by weight of pigment.

6. A glaze composition according to claim 5 wherein (A) is 70-96% by weight of glass flux composition consisting essentially of, by weight, 30-70% $SiO_2$, 10-30% CaO, 0-20% ZnO, 3-8% $MoO_3$, 0-20% $B_2O_3$, 0-25% $Al_2O_3$, 0-10% $K_2O$, 0-10% $Na_2O$, 0-10% MgO, 0-15% BaO, 0-7% $Li_2O$, 0-10% PbO, 0-5% SrO, 0-10% CeO, 0-0.1% CoO and 0-5% $P_2O_5$.

7. A ceramic article bearing on its surface a glaze composition which has been fired thereon, the glaze composition consisting essentially of:
(A) 70-96% by weight of glass flux composition comprising a component consisting essentially of, by weight, 30-70% $SiO_2$, 10-30% CaO, 0-20% ZnO, 3-8% $MoO_3$, 0-20% $B_2O_3$, 0-25% $Al_2O_3$, 0-10% $K_2O$, 0-10% $Na_2O$, 0-10% MgO, 0-15% BaO, 0-7% $Li_2O$, 0-10% PbO, 0-5% SrO, 0-10% CeO, 0-0.1% CoO and 0-5% $P_2O_5$;
(B) 4-30% by weight of refractory material; and
(C) 0-25% by weight of pigment.

8. A ceramic article bearing on its surface a glaze composition which has been fired thereon, the glaze composition consisting essentially of:
(A) 70-96% by weight of glass flux composition consisting essentially of, by weight, 30-70% $SiO_2$, 10-30% CaO, 0-20% ZnO, 3-8% $MoO_3$, 0-20% $B_2O_3$, 0-25% $Al_2O_3$, 0-10% $K_2O$, 0-10% $Na_2O$, 0-10% MgO, 0-15% BaO, 0-7% $Li_2O$, 0-10% PbO, 0-5% SrO, 0-10% CeO, 0-0.1% CoO and 0-5% $P_2O_5$;
(B) 4-30% by weight of refractory material; and
(C) 0-25% by weight of pigment.

9. A method of decorating a ceramic body, which method comprises applying to the ceramic body a glaze composition which consists essentially of:
(A) 70-96% by weight of glass flux composition consisting essentially of, by weight, 30-70% $SiO_2$, 10-30% CaO, 0-20% ZnO, 3-8% $MoO_3$, 0-20% $B_2O_3$, 0-25% $Al_2O_3$, 0-10% $K_2O$, 0-10% $Na_2O$, 0-10% MgO, 0-15% BaO, 0-7% $Li_2O$, 0-10% PbO, 0-5% SrO, 0-10% CeO, 0-0.1% CoO and 0-5% $P_2O_5$;
(B) 4-30% by weight of refractory material; and
(C) 0-25% by weight of pigment;
and then firing the composition.

10. A method according to claim 9 wherein a glazed wall tile is produced.

11. A method according to claim 9 wherein a glazed pottery article is produced.

* * * * *